United States Patent Office
3,184,463
Patented May 18, 1965

3,184,463
1,4-BIS-(2-METHOXY-4-SUBSTITUTED-PHENOXY-
ACETYL)PIPERAZINES AND METHOD OF
MAKING SAME
Tsutomu Irikura, 72 Shimura-Nakadaimachi, Itabashi-ku;
Kuniyosi Masuzawa, 6333 2-chome, Tagaramachi,
Nerima-ku; and Keigo Nishino, 32 3-chome, Ukima-
cho, Kita-ku, all of Tokyo, Japan
Filed June 18, 1963, Ser. No. 288,706
Claims priority, application Japan, Sept. 24, 1962,
37/41,851
3 Claims. (Cl. 260—268)

The present invention relates to novel kinds of pipera-
zine derivative and more particularly to 1,4-disubstituted
piperazines represented by the general formula

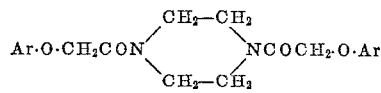

as well as to the method for preparing the same, in the
above formula Ar standing for an aromatic radical which
carries as substituent groups beside a lower alkoxy radical
either an alkyl or an alkenyl radical.

The novel kinds of compounds of the present invention
showing an analgetic activity all but comparable to that
of codeine phosphate, and that without any accompanying
hypnotic effect, may also in the trivialness of their tox-
icity be looked upon as compounds of high medical value.

The compounds of the present invention may be ob-
tained by making an aryl glycolic acid derivative having
the above-mentioned substituent groups and being in the
form of halide, ester or acid anhydride react on a pipera-
zine preparation either anhydrous or hydrated in the
presence of an acid-removing agent and, if necessary, in
an inert solvent such as hydrocarbons, chlorinated hydro-
carbons, ethers and the like.

Figure 1:
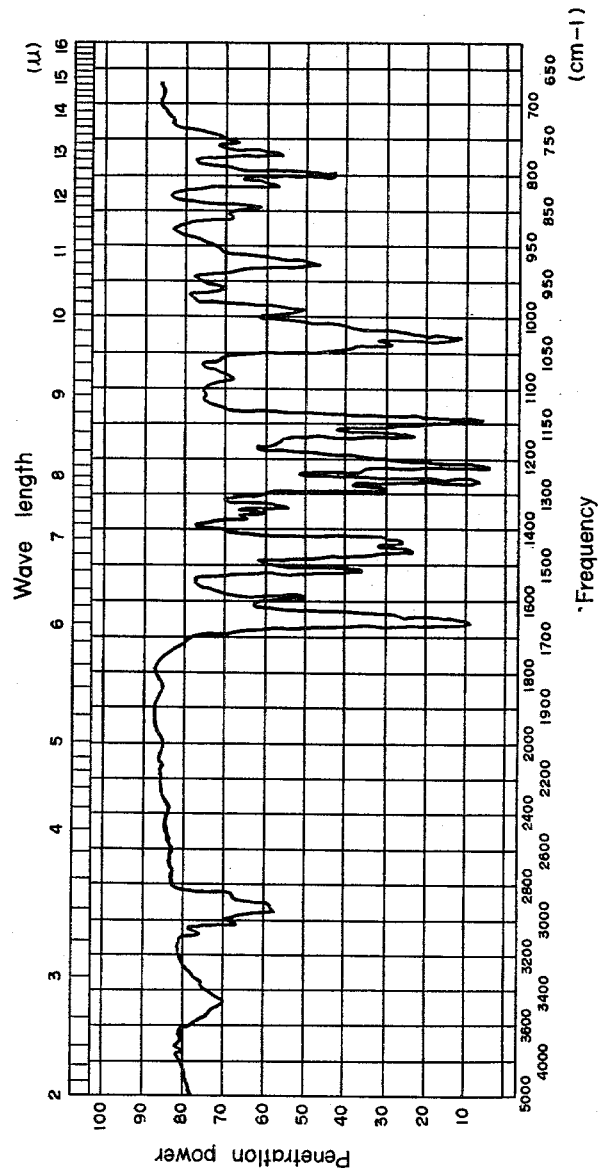
Figure 2:
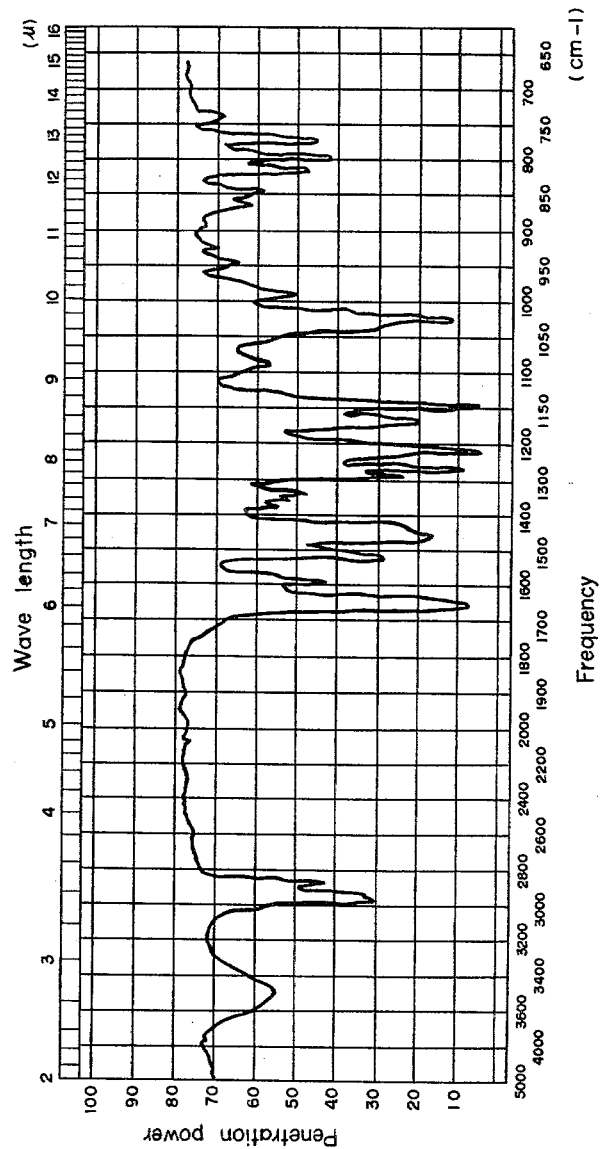
Figure 4:
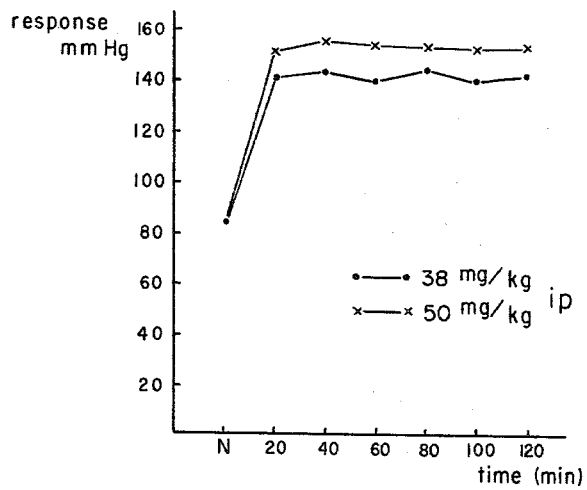
Figure 3:
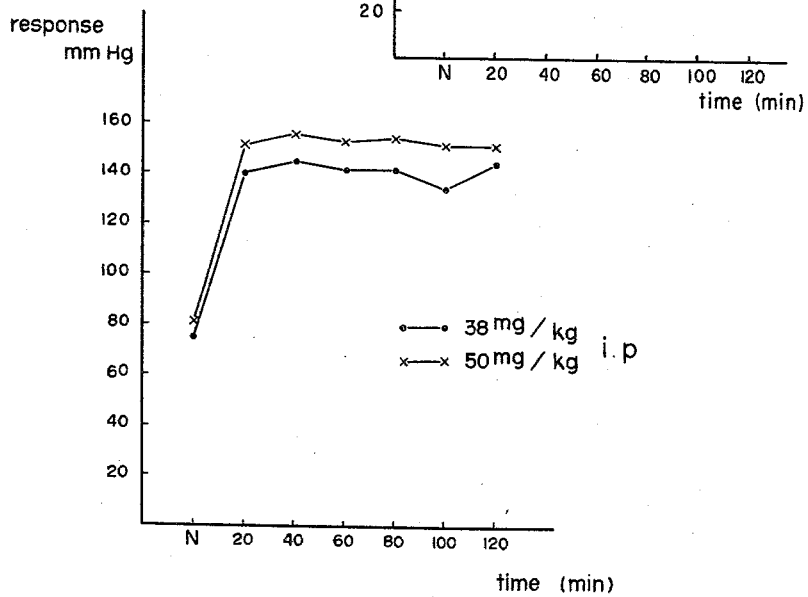
Figure 5:
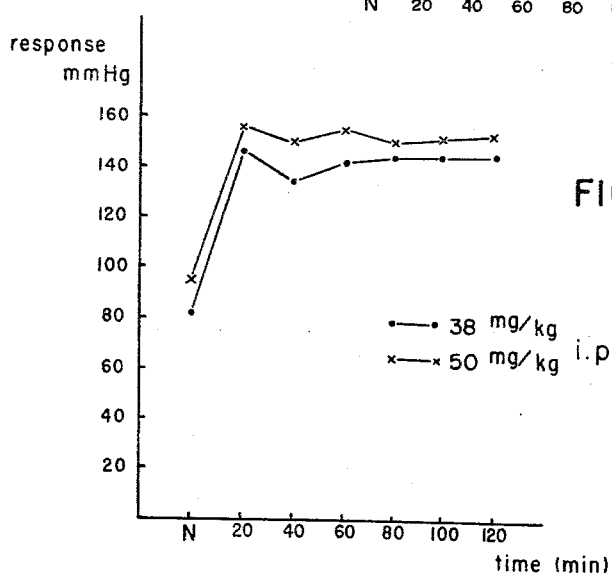

Curves shown in FIGS. 1 and 2 are infrared absorption
spectra of the 4-allyl compound and 4-propyl compound
obtained in accordance with the present invention, and
those presented in FIGS. 3, 4 and 5 are time changes in
analgetic effect of injected codeine phosphate, said 4-
allyl compound and 4-propyl compound, respectively.

The compounds of the present invention are obtained
in the form of crystalline powders which are in general
difficultly soluble in water, aqueous solutions of acid or
alkali, slightly soluble in ethyl alcohol and soluble in
trichloroethane, chloroform and dioxane. The infrared
spectra given in FIGS. 1 and 2 clearly point to that the
compounds are possessed of acid amide linkages.

In Table 1, values of relative analgetic effect and $LD_{50}$
are presented for two representative compounds of the
present invention, namely, 1,4-bis-(2-methoxy-4-allylphen-
oxyacetyl) piperazine abridged hereinafter as 4-allyl com-
pound and 1,4-bis-(2-methoxy-4-propylphenoxyacetyl)
piperazine abridged hereinafter as 4-propyl compound.
In determining the analgetic effect, every 10 mice individ-
uals were submitted after intraperitoneal injection to the
routine type of test of irritating by pressure. The values
of analgesic potency ratio recorded in Table 1 are the
results appraised in comparison with the effect of codeine
phosphate administered as standard medicine, the figures
being obtained by the four points assay.

TABLE 1

| Medicine | Analgesic potency ratio | Fiducial limit ($\alpha=0.05$) | $LD_{50}$, mg. |
|---|---|---|---|
| Codeine phosphate | 1 | | |
| 4-allyl compound | 1.04 | 0.735~1.372 | 2,571 |
| 4-propyl compound | 1.01 | 0.967~1.069 | 15,000 |

FIGS. 3, 4 and 5 are graphical expressions of the time
change in analgetic effect observed for the above-men-
tioned three kinds of injected medicines, the graphs point-
ing to that the test animal is rapidly made insensitive to ap-
plied pressures.

As clearly shown by these results, both of said two com-
pounds of the present invention are comparable in their
analgetic efficacy to codeine phosphate and thus prove to
be useful medicines.

In the following, the invention will be more concretely
explained by way of examples.

*Example 1*

In 50 ml. of trichloroethane, 8.6 g. of piperazine is sus-
pended. This suspension is cooled so that its inner tem-
perature may be kept at 5~10° C. and added under stir-
ring with a solution containing about 24 g. of 2-methoxy-
4-allylphenoxyacetyl chloride as dissolved in 50 ml. of
trichloroethane drop by drop in a period of one hour.
The mixture is then raised of its temperature until it at-
tains to 25~30° C. and kept under stirring in this tem-
perature range for further 3~4 hours. After filtering off
the crystalline deposit there formed (to be used in the
next run of preparation), the filtrate is washed first with
5% hydrochloric acid and then with water. When the
washed filtrate is dehydrated by means of anhydrous
sodium sulphate and freed from the solvent under a
reduced pressure, a residue is obtained which is yellowish
in color. By two times recrystallization from ethyl-
alcohol in the presence of decolorizing charcoal, 18.8 g.
of pale yellow, substantially white crystalline product is
obtained of which melting point is 123~125° C.

(The yield corresponds to 76.2% of the theoretical
value.)

*Analysis.*—Calculated: N, 5.66%. Found: N, 5.78%
IR: $\nu_{c=o}=1600$ cm.$^{-1}$.

The acid chloride used as starting material in this exam-
ple is prepared by treating 2-methoxy-4-allylphenoxy
acetic acid with thionyl chloride in benzene and can be
used without subjecting it to any further purification like
distillation.

*Example 2*

In 50 ml. of trichloroethane, 8.6 g. of piperazine is
suspended. This suspension is cooled so that its inner
temperature may be kept at 5~10° C. and added under
stirring with a solution containing about 24 g. of 2-meth-
oxy-4-propyl phenoxyacetyl chloride as dissolved in 50
ml. of trichloroethane drop by drop over a period of one
hour. The mixture is kept under stirring at room tem-
perature for further 3~4 hours. The piperazine hydro-
chloride there produced is removed by filtration. After
washing the filtrate with 5% hydrochloric acid followed
by water, the washed filtrate is dehydrated by means of
anhydrous sodium sulfate and freed from the solvent
under a reduced pressure from the solvent. When the
residue is recrystallized from ethyl alcohol in the presence
of decolorizing charcoal, there is obtained 16.9 g. of a crystalline product which appears pale yellow, substantially white.

(The yield amounts to 68.1% of the theoretical value.)
Melting point: 128~130° C.
Analysis.—Calculated: N, 5.62%. Found: N, 5.50%.
IR: $\nu_{C=O}=1660$ cm.$^{-1}$.

What is claimed:
1. Compounds of the formula

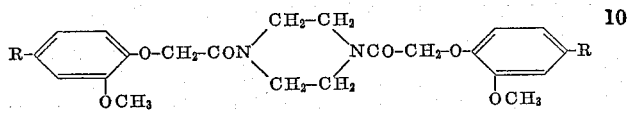

in which each R is selected from the group consisting of allyl and n-propyl.
2. Compound according to claim 1, wherein R is allyl.
3. Compound corresponding to claim 1, wherein R is n-propyl.

References Cited by the Examiner
UNITED STATES PATENTS 2,286,390  6/42  Sparks _____ 260—268
2,969,372  1/61  Braun et al. _____ 260—310

NICHOLAS S. RIZZO, Primary Examiner.
WALTER A. MODANCE, Examiner.